(12) United States Patent
Keller

(10) Patent No.: US 6,857,534 B1
(45) Date of Patent: Feb. 22, 2005

(54) FUEL TANK AND METHOD FOR PRODUCING SAME

(75) Inventor: Dieter Keller, Aschaffenburg (DE)

(73) Assignee: Siemens AG (DE)

( * ) Notice: Subject to any disclaimer, the term of this patent is extended or adjusted under 35 U.S.C. 154(b) by 687 days.

(21) Appl. No.: 09/214,663

(22) PCT Filed: Jul. 3, 1997

(86) PCT No.: PCT/EP97/03511
§ 371 (c)(1),
(2), (4) Date: Aug. 27, 1999

(87) PCT Pub. No.: WO98/01315
PCT Pub. Date: Jan. 15, 1998

(30) Foreign Application Priority Data

Jul. 10, 1996 (DE) .......................................... 196 27 742

(51) Int. Cl.⁷ ............................................. B65D 87/12
(52) U.S. Cl. ..................................... 220/4.13; 220/4.14
(58) Field of Search ................................. 220/4.13, 4.14

(56) References Cited

U.S. PATENT DOCUMENTS

| 4,453,564 A | 6/1984 | Bergesio |
| 4,526,286 A | 7/1985 | Jüng et al. |

FOREIGN PATENT DOCUMENTS

| EP | 0064310 | 11/1982 |
| JP | 2296537 | 12/1990 |

*Primary Examiner*—Joseph Man-Fu Moy
(74) *Attorney, Agent, or Firm*—Mayer, Brown, Rowe & Maw LLP

(57) ABSTRACT

A plastic fuel tank is formed by welding together an upper plastic shell (1) having an upper closing wall (8) and a lower plastic shell (2) forming a bottom (7). The two plastic shells (1, 2) are produced by the injection molding method. In order to adhere to an exact distance between the upper closing wall (8) and the bottom (7), spacers (9) coming into abutment during the welding operation are provided in the fuel tank.

6 Claims, 1 Drawing Sheet

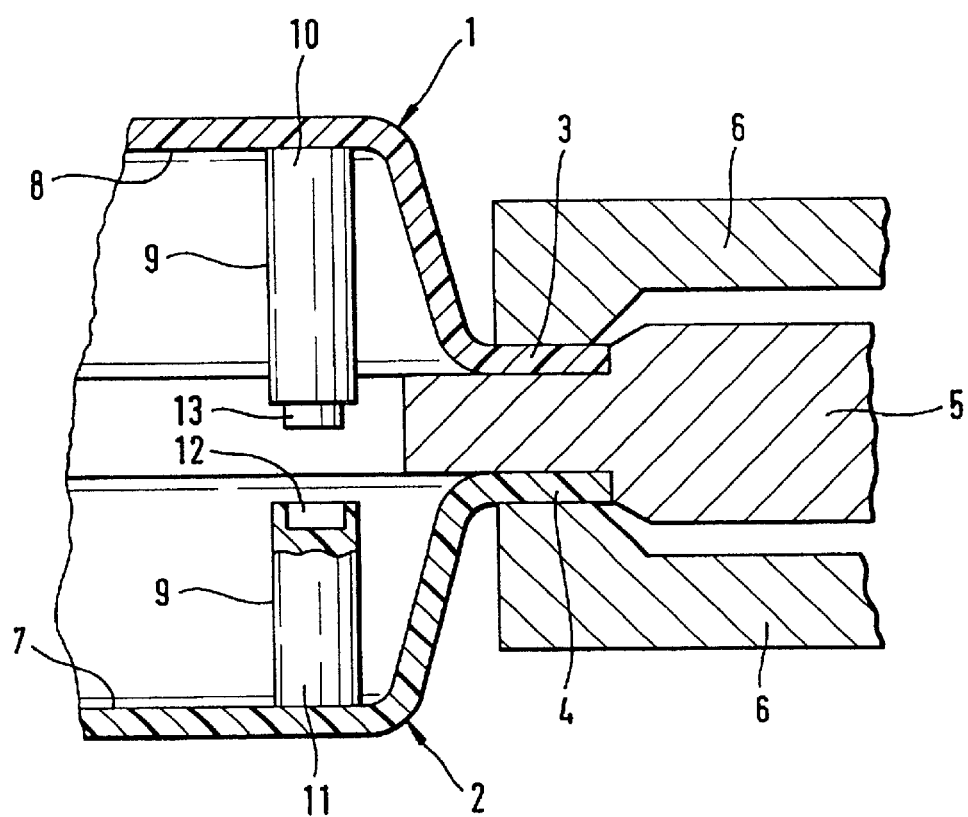

FUEL TANK AND METHOD FOR PRODUCING SAME

BACKGROUND

1. Field of the Invention

The invention relates to a plastic fuel tank with a bottom and with an upper closing wall. The invention relates, furthermore, to a method for producing such a fuel tank.

2. Related Art

The plastic fuel tanks used in automobiles are at the present time produced by the blowing method. As a result, such fuel tanks can be produced cost-effectively, but relatively large tolerance deviations have to be accepted. There is a particular disadvantage when the distance between the bottom and the upper closing wall is different in fuel tanks belonging to a particular series, because corresponding deviations may then occur in determining the filling volume. In the case of fuel tanks produced by the blowing method, the mounting of fitting parts necessary in the fuel tank also presents difficulties, because these fitting parts have to be introduced through an inlet connection piece or a mounting orifice having a relatively narrow cross section.

SUMMARY OF THE PRESENTLY PREFERRED EMBODIMENTS

The problem on which the invention is based is to design a fuel tank of the type initially mentioned, in such a way that fitting parts can be installed in it as simply as possible and tolerances which are as narrow as possible can be adhered to in the distance between its upper closing wall and the bottom. Furthermore, a method for producing such a fuel tank is to be found.

The first mentioned problem is solved, according to the invention, in that the fuel tank is produced by welding together an upper plastic shell having the upper closing wall and a lower plastic shell forming the bottom, in that the two plastic shells have been produced by the injection molding method, and in that, in order to adhere to an exact distance between the upper closing wall and the bottom, spacers coming into abutment during the welding operation are provided in the fuel tank.

In such a fuel tank, fitting parts can be integrally formed in their final position prior to injection molding, so that there is no need for subsequent difficult installation through a filler neck or a mounting orifice. The spacers make it possible always to press the plastic shells one toward the other at exactly the same distance during the welding operation, so that, irrespective of manufacturing tolerances, there are always the same distances between the bottom and the upper closing wall, this being advantageous for determining the filling volume accurately.

The spacers can be produced cost-effectively in the same operation as the production of the plastic shells, if the spacers are integrally formed on the upper plastic shell and/or the lower plastic shell.

Alternatively, however, it is also possible to design the spacers as separate components which can be inserted into the plastic shells before these are welded together.

The plastic shells are necessarily oriented exactly with one another during the welding operation, if, according to another development of the invention, the spacers are designed for the positive connection of the plastic shells.

The second mentioned object, specifically to provide a method for producing a fuel tank having the abovementioned features, is achieved, according to the invention, in that, first, an upper plastic shell and a lower plastic shell are produced by the injection molding method, in that, subsequently, the plastic shells are placed one on the other, with a heating element being interposed in the region of a peripheral welding edge of each plastic shell, and the welding edges are then heated by means of the heating element, and in that, after the welding edges have been heated, the heating elements are removed and the plastic shells are then pressed one toward the other until spacers arranged in the fuel tank have come into abutment.

Such a fuel tank can be produced very cost-effectively and makes it possible for fitting parts to be positioned in the plastic even while the fuel tank is being produced. The plastic shells can be connected to one another by pressure welding by virtue of the spacers.

The plastic shells can be welded together reliably in a way which is conventional per se, if the welding edges of the plastic shells are each formed by a flangelike edge directed outward, and if, in order to press the plastic shells together, a gripper engages over the two flangelike edges resting one on the other.

These and other features and advantages of the invention will be apparent upon consideration of the following detailed description of the preferred embodiments of the invention, taken in conjunction with the appended drawings.

BRIEF DESCRIPTION OF THE DRAWING

The FIGURE shows an edge region of a fuel tank during the manufacturing phase of a preferred embodiment of the present invention.

DETAILED DESCRIPTION OF THE PRESENTLY PREFERRED EMBODIMENT

The fuel tank illustrated in the drawing consists of an upper plastic shell 1 and of a lower plastic shell 2 which are produced by the injection molding method and into which fitting parts, not shown, may be integrated. Both have an edge 3, 4 directed outward in a flangelike manner. In the position illustrated, a heating element 5 is located between these edges 3, 4. By means of this heating element, the plastic is heated in the region of the edges 3, 4, until it is pasty, the heating element 5 is then withdrawn and the edges 3, 4 are subsequently pressed together, for example by means of a gripper 6, so that the edges 3, 4 are welded to one another. The component shown as a gripper 6 may also be a further heating device. Pressing together may also be carried out by means of a differently designed gripper or in a completely different way.

It is important for the invention that the distance between the plastic shells 1, 2 is adhered to exactly, so that a bottom 7 of the lower plastic shell 2 is at an exact distance from an upper closing wall 8 of the upper plastic shell 1. This purpose is served by a spacer 9, said spacers coming into contact with one another when the plastic shells 1, 2 are welded together. In the exemplary embodiment shown, the spacer 9 consists of a stay 10 integrally formed on the upper plastic shell 1 and projecting downward and of a stay 11 integrally formed on the lower plastic shell 2 and directed upwardly. The stay 11 has, in its end face, a recess 12, into which a tenon 13 of the lower end face of the upper stay 10 fits. In the finished state, the tenon 13 engages positively into the recess 12.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A plastic fuel tank with a bottom and with an upper closing wall, defined in that it is produced by welding together an upper plastic shell having the upper closing wall and a lower plastic shell forming the bottom, in that the two plastic shells have been produced by injection molding, and in that, in order to adhere to an exact distance between the upper closing wall and the bottom, spacer coming into abutment during the welding operation are provided in the fuel tank in the region of the weld seam, wherein the spacers are integrally formed on the upper plastic shell and/or the lower plastic shell.

2. A plastic fuel tank with a bottom and with an upper closing wall, defined in that it is produced by welding together an upper plastic shell having the upper closing wall and a lower plastic shell forming the bottom, in that the two plastic shells have been produced by injection molding, and in that, in order to adhere to an exact distance between the upper closing wall and the bottom, spacer coming into abutment during the welding operation are provided in the fuel tank in the region of the weld seam, wherein the spacers are designed as separate components which can be inserted into the plastic shells before these are welded together.

3. A plastic fuel tank having a bottom and an upper closing wall, wherein the bottom comprises a lower plastic shell; the upper closing wall comprises an upper plastic shell; the lower plastic shell and the upper plastic shell are welded together along a weld seam; and spacers are provided in the region of the weld seam to provide a predetermined distance between the upper closing wall and the bottom; wherein the spacers are integrally formed on the upper plastic shell and/or the lower plastic shell.

4. The fuel tank as claimed in claim 3, wherein the spacers engage a recess formed in either the upper plastic shell or the lower plastic shell.

5. A plastic fuel tank having a bottom and an upper closing wall, wherein the bottom comprises a lower plastic shell; the upper closing wall comprises an upper plastic shell; the lower plastic shell and the upper plastic shell are welded together along a weld seam; and spacers are provided in the region of the weld seam to provide a predetermined distance between the upper closing wall and the bottom;

wherein the spacers are designed as separate components which can be inserted into the plastic shells before these are welded together.

6. The fuel tank as claimed in claim 5, wherein the spacers engage a recess formed in either the upper plastic shell or the lower plastic shell.

* * * * *